(12) United States Patent
Kingston et al.

(10) Patent No.: US 11,175,242 B2
(45) Date of Patent: Nov. 16, 2021

(54) GEOMETRIC ALIGNMENT, SAMPLE MOTION CORRECTION, AND INTENSITY NORMALIZATION OF COMPUTED TOMOGRAPHY PROJECTIONS USING PI-LINE OPTIMIZATION

(71) Applicant: FEI Company, Hillsboro, OR (US)

(72) Inventors: Andrew Kingston, Holder (AU); Olaf Delgado-Friedrichs, Turner (AU); Glenn Myers, Waramanga (AU); Shane Latham, Griffith (AU); Adrian Sheppard, Fisher (AU); Trond Varslot, Oslo (NO); Petr Střelec, Brno (CZ)

(73) Assignee: FEI Company, Hillsboro, OR (US)

( * ) Notice: Subject to any disclaimer, the term of this patent is extended or adjusted under 35 U.S.C. 154(b) by 243 days.

(21) Appl. No.: 15/926,621

(22) Filed: Mar. 20, 2018

(65) Prior Publication Data

US 2019/0293574 A1 Sep. 26, 2019

(51) Int. Cl.
*G06K 9/00* (2006.01)
*G01N 23/046* (2018.01)

(52) U.S. Cl.
CPC ..... *G01N 23/046* (2013.01); *G01N 2223/419* (2013.01)

(58) Field of Classification Search
CPC . G06T 2207/10116; G06T 2207/10124; G06T 2207/10121
See application file for complete search history.

(56) References Cited

U.S. PATENT DOCUMENTS

| | | | | | |
|---|---|---|---|---|---|
| 5,687,251 | A | * | 11/1997 | Erler | G06T 7/0012 382/133 |
| 5,946,371 | A | * | 8/1999 | Lai | A61B 6/032 378/15 |
| 2007/0036418 | A1 | * | 2/2007 | Pan | A61B 6/027 382/131 |
| 2007/0177713 | A1 | * | 8/2007 | Kohler | G06T 11/005 378/4 |
| 2009/0274354 | A1 | * | 11/2009 | Ng | A61B 6/4028 382/131 |
| 2012/0039434 | A1 | * | 2/2012 | Wang | A61B 6/5205 378/11 |
| 2012/0093281 | A1 | * | 4/2012 | Zamyatin | G06T 11/005 378/15 |

(Continued)

OTHER PUBLICATIONS

Kingston, Andrew, et al. "Geometric alignment of helical tomographic projection data using PI-lines." Proc. 1st Int. Conf. Tomography Mater. Struct.. 2013. (Year: 2013).*

(Continued)

*Primary Examiner* — Hadi Akhavannik

(57) ABSTRACT

Methods and apparatuses are disclosed herein to correct for inconsistencies in CT scans based on pi-lines. An example method at least includes acquiring a plurality of projections of a sample, each projection of the plurality of projections acquired at a different location around the sample based on a trajectory, determining pairs of opposing projections from the plurality of projections based on a respective pi-line, and determining an amount of inconsistency between respective pi-line data for each pair of opposing projections, where the pi-line data is based, at least in part, on attenuation data.

27 Claims, 7 Drawing Sheets

(56) References Cited

U.S. PATENT DOCUMENTS

| | | | |
|---|---|---|---|
| 2012/0140874 A1* | 6/2012 | Li ........................ | A61B 6/4452 378/11 |
| 2012/0301004 A1* | 11/2012 | Kingston ............... | A61B 6/032 382/131 |
| 2017/0061610 A1* | 3/2017 | Kingston ............... | G06T 11/005 |
| 2018/0137657 A1* | 5/2018 | Katsevich ............. | G06T 11/006 |

OTHER PUBLICATIONS

Latham, Shane J., et al. "Multi-resolution radiograph alignment for motion correction in x-ray micro-tomography." Developments in X-ray Tomography X. vol. 9967. International Society for Optics and Photonics, 2016. (Year: 2016).*

Patel, V., et al. "Self-calibration of a cone-beam micro-CT system." Medical physics 36.1 (2009): 48-58. (Year: 2009).*

Olaf Delgado-Friedrichs, et al., PI-line difference for alignment and motion-correction of cone-beam helical-trajectory micro-tomography data, Journal of Trans. on Computation Imaging, 2017, vol. XX, No. YY.

* cited by examiner

GEOMETRIC ALIGNMENT, SAMPLE MOTION CORRECTION, AND INTENSITY NORMALIZATION OF COMPUTED TOMOGRAPHY PROJECTIONS USING PI-LINE OPTIMIZATION

FIELD OF THE INVENTION

This disclosure is generally directed toward computed tomography and more specifically toward optimizing pi-line consistency to obtain geometric alignment, sample motion correction, and intensity normalization in computed tomography.

BACKGROUND

Computed Tomography (CT) uses various matter to investigate a sample, such as x-rays and electron beams, to obtain data of internal structure of the sample. CT-based systems conventionally move, e.g., rotate, the sample and x-ray source and detector relative to one another to obtain data at many angles around a sample. The scan data may then be algorithmically manipulated to obtain reconstructions of regions within the sample. The resolution of the reconstructions may be affected by the distances between the various components, such as the source, sample and detector. For example, a large distance between the source and sample conventionally reduces the resolution of the obtained data in a cone-beam CT arrangement. Additionally, the quality of the reconstructions may be affected by time-dependent changes of the system components that occur during a scan. For example, movement of the sample and/or source-detector may not be exactly as expected, resulting in misalignment. Further, time-varying source intensity may also affect the obtained data.

The misalignment may affect the quality of the reconstructions. While many attempts to mitigate such time-dependent misalignment and source intensity variations have been implemented, these attempts require high computational overhead or extremely precise mechanics. As such, a method to address such time-dependent misalignment and source intensity variations is desired that overcomes the issues of previous solutions. More generally, this method can be applied to the post-acquisition estimation of any form of deviation from the idealized experiment that would manifest in a non-zero opposing ray-difference value.

SUMMARY

Methods and apparatuses are disclosed herein for geometric alignment, sample motion correction, and intensity normalization of computed tomography projections using pi-line optimization. An example method at least includes acquiring a plurality of projections of a sample, each projection of the plurality of projections acquired at a different location around the sample based on a trajectory, determining pairs of opposing projections from the plurality of projections based on a respective pi-line, and determining an amount of inconsistency between respective pi-line data for each pair of opposing projections, where the pi-line data is based, at least in part, on measured intensity data.

A CT system includes a source to provide x-rays, a detector to detect x-rays after having passed through a sample, and a controller coupled to control the source and the detector, the controller further including code, that when executed by the controller, cause the controller to acquire a plurality of projections of a sample, each projection of the plurality of projections acquired at a different location around the sample based on a trajectory, determine pairs of opposing projections from the plurality of projections based on a respective pi-line, and determine an amount of inconsistency between respective pi-line data for each pair of opposing projections, where the pi-line data is based, at least in part, on attenuation data.

BRIEF DESCRIPTION OF THE DRAWINGS

Like reference numerals refer to corresponding parts throughout the several views of the drawings.

DETAILED DESCRIPTION OF EMBODIMENTS

Figure 1:
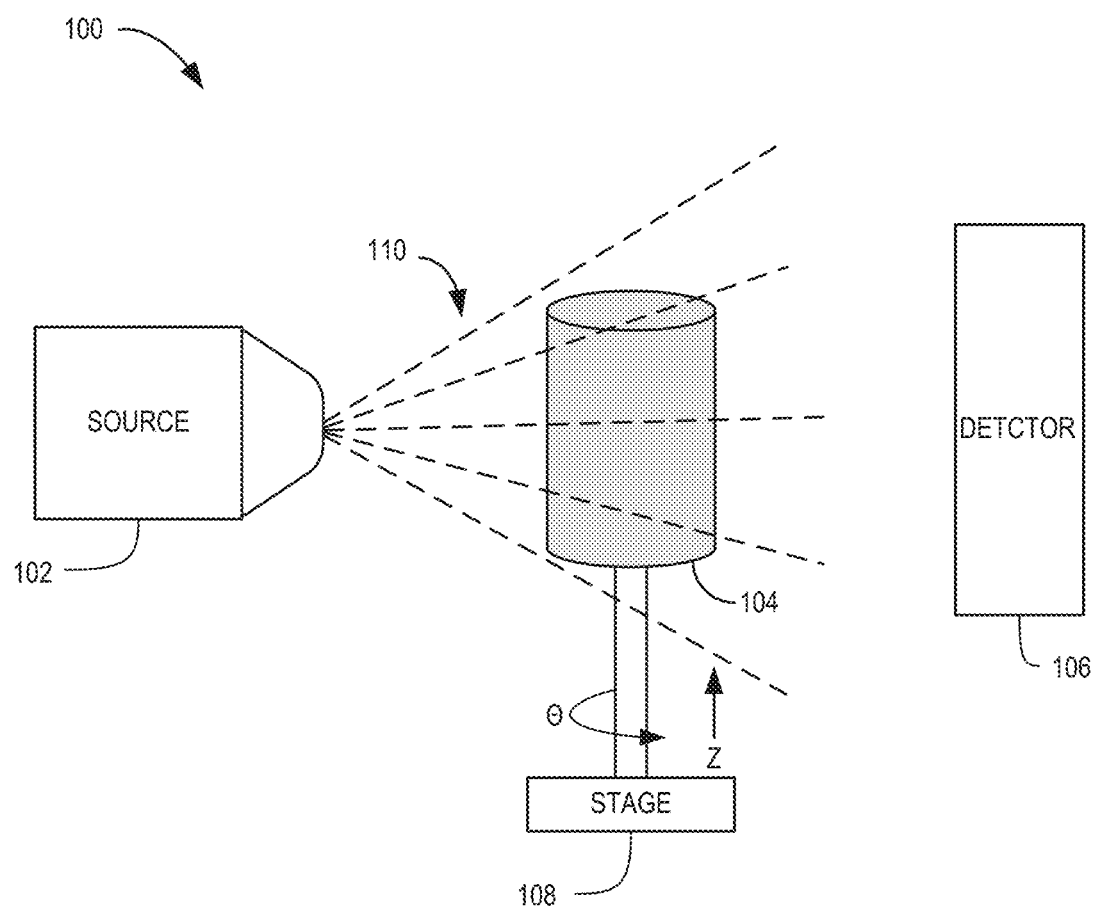
FIG. 1 is an illustrative schematic of a CT system in accordance with an embodiment of the present disclosure.

Embodiments of the present invention are described below in the context of a tomographic imaging apparatus for micrometer-scale or nanometer-scale computed tomography of small objects, that may be any shape but which are frequently cylindrical in shape, using a cone-shaped x-ray beam and a circular or helical scanning trajectory. In some embodiments, pi-lines can be used to align projections, such as pairs of projections that are near to opposing one another, to correct for time-dependent misalignment and other time-varying changes of the system and may be combined with techniques for correction of static misalignments. Such time-dependent misalignment and other time-varying changes, such as inconsistent source brightness may be generally referred to as inconsistencies in data associated with opposing projections. However, it should be understood that the methods described herein are generally applicable to a wide range of different tomographic methods and apparatus, including both cone-beam and parallel beam systems, and are not limited to any particular apparatus type, beam type, object type, length scale, or scanning trajectory As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections. In addition, the values selected may be obtained by numerical or other approximate means and may only be an approximation to the theoretically correct/value.

Laboratory-based CT systems, which may be used to obtain data at the micron and/or nanometer scales, are used to image various samples. The samples may be biological, mineral, crystal, etc., and a resulting image may be a reconstruction of the internal structure. In general, a CT system includes an x-ray source and detector with a sample arranged in between. The CT source may emit radiation equally over a wide-angled cone (wide-angled cone based CT may be referred to as cone-beam tomography), and the efficiency of such cone-beam tomography increases with higher cone angles incident on the sample, which may be obtained using small distances between the source and the sample. As noted, these CT systems either move the sample with respect to the source and detector, or move the source and detector in concert relative to the sample. In some embodiments, relative movement of the sample with respect to the source and detector may include a rotation of either the sample or the source-detector pair. For example, the sample may be rotated, i.e., spun, on an axis in a space between the source and detector. The CT systems may experience time-dependent misalignment during scans and/or inconsistencies in functioning of various components from projection to projection that may undesirably degrade the quality of the reconstructions, for example.

A range of effects can cause undesired relative movement of x-ray source point, sample, and detector resulting in misalignment of the tomographic apparatus. Some components of CT systems may vary during data acquisition, e.g., x-ray source point drift, inaccuracies in motorized positioning stages, and thermal expansion of components, to provide a few examples, and which result in misalignment errors. Additionally, temporal or spatial variations in source intensity and/or spectral composition of the source may also cause inconsistent data. The inconsistent data degrades image quality, usually by introducing artifactual spatial variations in gray-values in reconstructed images, for example. Both the alignment issues and the inconsistent data issue may degrade images and reconstructions of CT systems. As used herein, inconsistency may be used to describe misalignment, inconsistent data, or both, and the techniques disclosed herein address problems related to both, either on their own or in combination.

The errors associated with motorized positioning can pose severe problems in some instances. Standard mechanical stages may be unable to provide a full three-dimensional positioning accuracy required for micro- and nano-CT systems. It is conventionally desirable to have stages capable of high loads and with large travel distances. However, such stages may not be sufficiently precise, and may exhibit repeatable and non-repeatable motion errors, e.g., backlash. It is therefore normally essential to correct for misalignment in micro-CT image reconstruction. This disclosure elucidates a technique for identifying and correcting for both static and time-dependent errors based on minimal assumptions and with relatively small computational overhead. Compared to previous techniques, the disclosed approach is significantly more robust and efficient, particularly when applied to data acquired from highly isotropic scanning trajectories, such as space-filling trajectories, which could be because more isotropic trajectories possess pi-lines that are more widely distributed through the space of possible positions and angles.

Additionally, errors associated with inconsistent data due to temporal or spatial variations in source intensity and/or spectral composition of the source may pose problems with forming reconstructions. For example, differences in source intensity and/or spectral composition may lead to different attenuation data, for example, and may result in a poor match between opposing projections.

Scanning trajectories, whether circular, helical, double helical, or space-filling, tend to have a plurality of pairs of projections in which the source points are substantially on opposing sides of a sample. Conventionally, the scanning trajectories may be defined by a coordinate system in the reference frame of the sample, where the trajectory is defined by the motion of the point source in the coordinate system. The correctly aligned data may lead to higher quality reconstructed images. The improvements may contribute to increased symmetry of the scanning trajectory, either actual or estimated, lowered variation in magnification across the sample or from a larger number of viewing angles, for example. However, if the oppositely aligned projections are not in the expected/desired location based on a model of the trajectory, e.g., due to static and/or time-dependent misalignment as discussed above, then the resulting reconstructions may have less than desirable qualities, such as ghost edges, blurring smearing/streaking, "double-edges," etc. These misalignments tend to be more consequential for micro- and nano-CT due to the size of the voxels and the relative misalignment being on similar scales. While various alignment techniques have been developed over the years, such as software-based alignment post data acquisition ('a-posteriori') and physical alignment of the systems prior to data acquisition, such known techniques either provide imperfect correction, or require large time and/or cash overheard. As such, a less computing intensive alignment technique is desired.

One solution includes a high-precision, a posteriori technique to measure and correct for time-dependent misalignment of a tomographic apparatus prior to the reconstruction process by exploiting pairs of rays from different directions that traverse the same path through a sample but in opposite directions and thus provide redundant information. As used herein "ray" and "rays" includes the medium, e.g., x-ray or electron, traversing the sample along a path from source to detector. Each ray may impinge a pixel on the detector and, an intensity level of the associated ray is recorded. The intensity level being indicative of an amount of attenuation the ray experienced traversing the sample or an amount of refraction/diffraction due to the phase nature of the sample. The intensity levels recorded across the detector may then contribute to, or provide, the two-dimensional projection image. The measured intensity of each ray passing through the sample may be compared to an intensity value from an equivalent but unimpeded ray, e.g. from a "bright field" projection acquired with the sample removed and the comparison provides an indication of an associated attenuation of the ray or phase change of the ray. The opposing rays that traverse the same path may be referred to as pi-lines, and each pi-line will traverse the source location of each projection of the pair or pairs of projections as well as the path through the sample. Another way to define the pi-line would be a straight line between the source of two opposing projections that traverses the same path through the sample and the source location of each of the opposing projections. Additionally, the detector data of the corresponding rays should be equal due to experiencing the same attenuation from the sample.

The technique may achieve system alignment, correct for motorized sample positioning errors, and compensate for temporal variations in source flux, e.g., x-ray flux variations since each of these factors may cause the two detector data points to be unequal. To achieve the above, the parameters governing the scanning trajectory, either modeled or actual, are varied to achieve maximum consistency between the pair of data points corresponding to each identified pi-line. To compensate for motion errors, the source point or detector position may be shifted in a per-projection basis while flux variations can be compensated by varying image intensity on a per-projection basis. Compared to other techniques, the pi-line technique discussed herein is more computationally efficient and can resolve static and time-dependent misalignment along with intensity variation in a single process. Variations of the technique can potentially be applied to incomplete scanning trajectories that possess insufficient pi-lines by being combined with epipolar consistency conditions or through use of a separate 'reference scan' where a redundant subset of the projections are acquired before or after the primary data acquisition. Further, the method may be combined with other existing techniques for correcting misalignments or variations, with the methods being combined either sequentially (where one method refines the other's estimate), jointly, or through allowing each method to correct distinct aspects.

Moreover, the technique, to obtain the low computational overhead, may use the raw collected data to determine whether any misalignment and/or inconsistency is present, and to correct for the misalignment/inconsistency, if desired. The raw data, in some embodiments, may be unprocessed detector data, or detector data that has lightly been corrected, such as for bright or dark field. The pi-lines may be determined and the raw data of associated pi-lines may be compared. In general the pi-lines may be computed in real (continuous) space and may not line up perfectly with a particular pixel on the detector. In this case some interpolation of detector pixel values will be required. If there is no misalignment/inconsistency, then the two data points corresponding to each pi-line (the 'pi-line data') should be identical since both rays traverse the same path through the sample regardless of direction resulting in identical attenuation. If, however, there is misalignment/inconsistency between the opposing projections, then the pi-line data may be different. To correct for the misalignment and/or inconsistency, one or both of the opposing, paired projections for each pi-line pair of projections may be translated, rotated or zoomed to minimize the difference. Alternatively, the scanning trajectory, actual or modeled, may be modified to represent the misalignments/inconsistency, for example by shifting the source point corresponding to each projection obtained during the scan. In some embodiments, each scan may result in a large number of pi-line pairs of projections, and the misalignment may be corrected for each pi-line pair either simultaneously or iteratively. It should generally be recognized that sub-pixel (or sub-voxel) accuracy can be obtained, both as a result of this interpolation on the detector but also because it is possible to interpolate the objective function computed using the optimization method to identify the minimum to sub-voxel precision.

While the discussion herein mainly includes complete scans of a sample, the disclosure should be not considered limited as such. It should be noted that the disclosure is also applicable to region of interest (ROI) scanning, where the field of view is just a portion of the sample. In ROI scanning, the intensity correction is particularly useful since there are no un-attenuated rays that can be compared to bright field values to estimate the intensity variation. In this case where the word 'sample' has been used it should be substituted with 'sub-volume of interest within the sample'.

FIG. 1 is an illustrative schematic of a CT system 100 in accordance with an embodiment of the present disclosure. The CT system 100 may be used to obtain projections of a sample and provide CT images and/or reconstructions in response. The CT system 100 may at least include a source 102, a stage 108, and a detector 106. In some embodiments, the source 102, stage 108, and detector 106 may be coupled to control electronics (not shown) that controls their operation and receives data from at least the detector 106. The CT system 100 may obtain projections, e.g., x-ray attenuation data, of a sample 104, which data may then be used to obtain reconstructions of desired areas and/or volumes of the sample 104. In some embodiments, pi-lines may be used to correct for time-dependent misalignment and/or source fluctuations of the CT system 100. In general, the terms "inconsistency," "inconsistencies," and "inconsistent data," may be used herein to collectively refer to both time-dependent misalignment and time-dependent source fluctuations, which includes source intensity and spectral composition. However, such terms may also refer to one or the other types of time-dependent issues. The correction of the inconsistencies may be performed a posteriori but before a reconstruction process. In some embodiments, the correction may use raw or slightly corrected projection data to correct for the inconsistencies. Conventionally, scan data may go through various preprocessing steps to correct for defective pixels, nonlinear detector response, beam hardening, dark fields, bright fields and/or linearization. As such, the pi-line-based correction, e.g. pi-line difference minimization, disclosed herein may take place at any stage within the preprocessing of the acquired data before the data is passed along for image reconstruction.

The source 102 may provide x-rays 110 in a cone-shape irradiating outward from the source 102 at high cone angles. As used herein, a "high cone angle" defines an angle referenced from a normal to the source 102. Based on this definition, a low cone angle would be a smaller angle referenced from the normal. In general, a high cone angle defines a larger cone, and a low cone angle defines a smaller cone. Additionally, the cone angle used to obtain any projection may be influenced by the relative distances between the source 102, the sample 104, and the detector 106. These relative distances may in general affect the resolution of the scans, and also the field of view (FOV). As noted, in general, the smaller these distances, a higher resolution scan may be obtained due to an increase in x-ray flux passing through the sample 104 and incident upon the detector 106.

The detector 106 may be positioned to receive x-rays having passed through the sample 104. The detector 106 may include a scintillator that generates visible light when irradiated by x-rays, and a CCD or amorphous silicon flat panel sensor mounted behind the scintillator that generates image data representing two-dimensional images of the spatial arrangement of scintillations generated by the scintillator. The result being a two-dimensional image or map of x-ray intensity for the x-rays transmitted through the object. The resulting map or x-ray intensity may be referred to as a projection, for example. As will be appreciated, each of these images shows both external and internal structural features of the sample 104, as projected along the directions of x-rays transmitted through the sample 104 to the detector 106.

The stage 108 supports the sample 104. In some embodiments, the stage 108 may be able to rotate either clockwise, counterclockwise, or both (the ⊖ shown in FIG. 1), and further be able to translate in an up and down motion as indicated in the Z direction as shown in FIG. 1. In some embodiments, however, the stage 108 may remain fixed while the source 102 and detector 106 rotate around the sample in concert while also translating in the +/−Z directions. The relative movement of the sample 104 and the source 103/detector 106 pair may define a trajectory used when obtaining projections, e.g., image data. In some embodiments, the trajectory may be two-dimensional, whereas in other embodiments, the trajectory may be three-dimensional. For example, a 2D trajectory may include a circle, e.g., a partial or full revolution, around the sample 104 in the same plane, and a 3D trajectory may include a helix or double helix performed around the sample 104. Space-filling (SF) trajectories may also be used to obtain projections of the sample 104, and may be considered 3D trajectories. SF trajectories may form an array of collection points arranged around the surface of the sample 104, and will be discussed in more detail below.

Trajectories are performed by the CT system 100 to obtain projections of the sample 104 from desired angles, e.g., viewpoints around the sample 104. The trajectories may be defined as paths and/or collection loci the source 102 and detector 106 take around the sample 104, regardless of which component is actually moving. While moving along a desired trajectory, the CT system 100 may take images at varying rates that include continuously, semi-continuously, or periodically. The images may then be combined/manipulated to obtain reconstructions of slices of the sample 104 along any desired plane.

The projections are x-ray images of the sample 104 due to x-rays 110. The x-rays 110 are emitted from the source 102 and transmit through sample 104 to impinge on detector 106. The x-rays 110 may be emitted in fan-type geometry or cone-type geometry, for example. Each individual x-ray 110 takes a different path or line from the source 102 to the detector 106, such that each x-ray 110 that traverses the sample 104 impinges a different pixel of the detector 106 or interstitial location on the detector 106, where an interstitial location occurs between two or more pixels. The detector data, e.g., raw intensity data, may then be the shadow of the sample 104 on the detector 106 due to attenuation of the x-rays by the sample 104 or due to the phase nature of the sample. As such, the detector data may provide attenuation information of the sample 104 according to each x-ray line or ray. For projections that are taken from opposite sides of the sample 104, there may be x-ray lines, e.g., rays, that align with one another and the source 102. The rays that align with each other may traverse the same path through the sample but in opposite directions. These types of x-ray lines, as discussed above, are referred to as pi-lines since they are separated by 180° from one another, e.g., separated by an angle of pi radians. Along with traversing the same line through the sample, the pi-lines will align with the source on both sides, as noted. When performing a projection, the CT system 100 may model the trajectory and, based on the model, determine which projections should be opposing, and further determine which pixel of the detector 106 would include the pi-line attenuation data. In some embodiments, the pi-lines may not impinge on a single pixel, but may be received by the detector 106 in between pixels, e.g., at interstitial locations. In such an embodiment, the pixel data of the pixels in the neighborhood of the point of impingement may be interpolated or averaged to provide pi-line pixel data.

Due to the pi-lines traversing the same path or line through the sample, they should have identical projection data, e.g., pixel data or attenuation data. If, however, the pixel data associated with the pi-lines is different, e.g., not identical, then it may be determined that the projections, e.g., pi-line projections, may be misaligned from one another. This misalignment, for example, may be due to time-dependent motion of the CT system component(s), such as source 102 drift, inconsistent stage 108 movement, inconsistent detector 106 movement, etc., or additionally due to geometric error or uncorrected shift in intensity/spectral content of the source 102. Additionally, if the opposing projections are inconsistent, either due to misalignment and/or source inconsistency, then reconstructions from the data may suffer or may not be possible. In general, the CT reconstructions may depend on a perfect or nearly perfect geometric model and if there are imperfections present in the motion, e.g., misalignments, or source inconsistency then the CT data may be inherently inconsistent and it may be difficult or impossible to produce a faithful reconstruction. For example, reconstructions from the inconsistent opposing projections may have degradation in the form of blurring, smearing/streaking, and "double edges," to name a few. The pi-lines may be used to correct the misalignment/inconsistencies and mitigate or eliminate the degradation from the projections and reconstructions. For example, if the CT system 100 determines that pi-lines from a pair of opposing projections are different, then the system 100 may shift one or both of the projections of the pair of opposing projections to minimize the difference in pi-line data. In some embodiments, the trajectory model may be adjusted to account for the misalignment. For example, the trajectory model may be parameterized to define where the projections would have been obtained without any time-dependent inconsistency/misalignment, and then the model shifted based on the pi-line inconsistency/misalignment and associated minimization. In other embodiments, the opposing projections may be shifted, rotated, or zoomed to align the pi-lines. In either case, correcting misalignments will in general place different pixels of the detector 106 at the end of each pi-line, thus changing the values being compared and therefore the overall pi-line consistency.

In general, each projection will usually pair with a large number of other projections for which the source point is somewhat on the other side of the sample. A pair of projections which are sufficiently opposing will contain a common but opposing ray path (e.g., the pi-line), because the source position of one projection lies within the field of view of the other projection. In some examples, there may be only one pi-line for each opposing pair of projections that may be used to align at least those two projections. The raw or nearly raw pixel data associated with the pi-lines based on a model of the trajectory may be used to align the projections using few assumptions. In general, the disclosed technique can determine misalignments from raw or nearly-raw pixel data using few assumptions, particularly by comparison with known methods. And because the alignment may be adjusted on a per projection basis, time-dependent misalignments that may occur between projections can be corrected or eliminated. Plus, trial reconstructions, needed for some other methods, may not be required for correcting the misalignment since the raw or nearly raw projection data is used for the corrections. While the pi-line based alignment is applicable to any type of trajectory, some trajectories may be corrected more easily or effectively than others. For example, an SF trajectory may be corrected more easily or effectively than a helical trajectory, which may be due to the areal layout of the SF trajectory and the corresponding broad distribution of pi-line directions and locations.

Figure 2A:
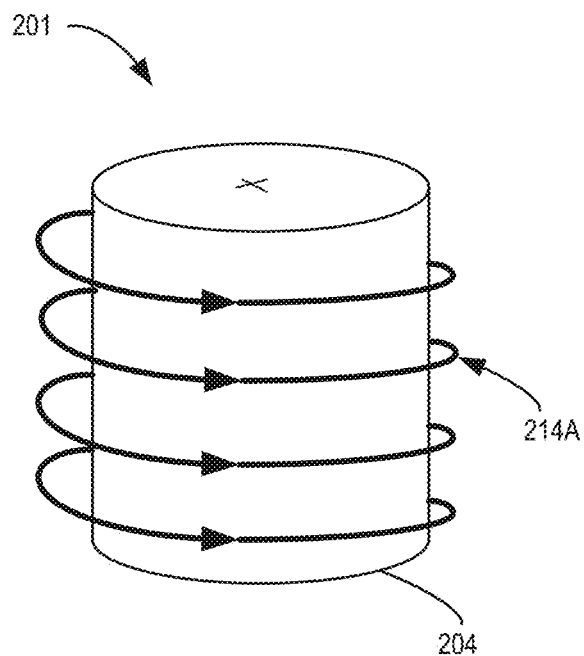
FIGS. 2A and 2B are example CT scans in accordance with an embodiment of the present disclosure.
Figure 2B:
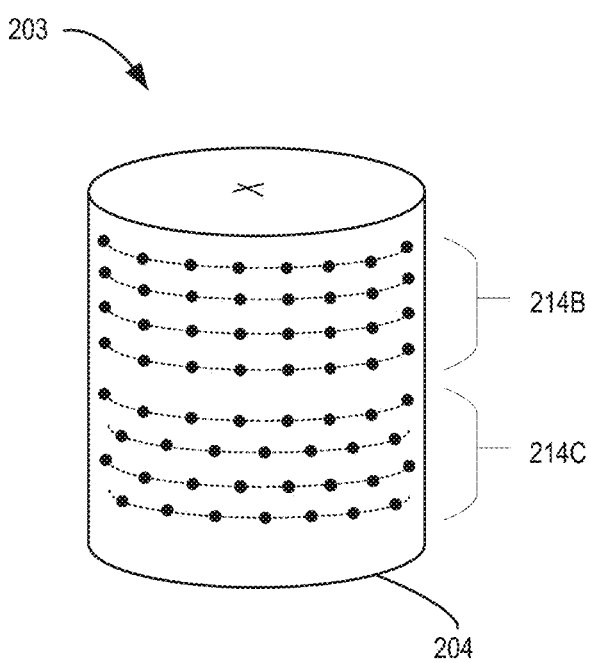

FIGS. 2A and 2B are example CT scans 201 and 203, respectively, in accordance with an embodiment of the present disclosure. The CT scans 201 and 203 (or scans for short) may be performed by the system 100, for example, and are performed to obtain projections of sample 204 based on different scan trajectories. For example, the scan 201 uses a scan trajectory 214A to obtain projections of the sample 204, whereas the scan 203 uses scan trajectories 214B and/or 214C to obtain projections of the sample 204. While only three different scan trajectories are disclosed, the scan trajectory implemented by any given CT scan is not a limiting aspect of the present disclosure, and all possible scan trajectories are contemplated herein. It should be noted that the drawings of the scans are not to scale, and that all distances between scan points or scan lines are contemplated herein. Projection data obtained with the scans 201 and 203 may be used to form tomograms and reconstructions of the sample 204, for example, and opposing projections obtained by CT scans 201 and 203 may be used to correct misalignments using associated pi-lines. It should be noted that, in general, there may be large numbers of opposing projections since each projection will be 'opposed' to a large number of other projections in the sense that they have a common but opposing ray path (e.g. they are linked through a pi line). It should also be noted that while the rays are in perfect opposition (i.e. 'pi' radians 180 degrees apart) the opposing projections only need to be sufficiently opposing that the source point of one lies in the field of view of the other. In some embodiments, the determined opposing projections may be based on a model of the implemented trajectory.

The scan trajectory 214A, which may be a helical or double helical scan trajectory, is implemented by scan 201. The scan trajectory 214A may cause the sample 204 to rotate and translate in a vertical direction with respect to a source and detector pair, such as the source 102 and the detector 106. For example, the sample 204 may be mounted on a stage that provides rotation and translation in the Z, e.g., vertical, direction. In some embodiments, the source and detector may also be moved, sometimes dynamically, while the source is rotating. In other embodiments, the source and detector may be stationary. The movement in both theta (e.g., rotation) and Z directions may be either performed continuously, semi-continuously, or periodically and projection data may be similarly obtained. The scan trajectory 214A may result in projection data obtained along the line that circumnavigates the sample 204 in the helical path, which may be referred to as the source trajectory in the coordinate frame where the sample is stationary. As such, there may be a plurality of opposing projections obtained around the sample 204 along the scan trajectory 214A path, and each pair of opposing projections will have an associated pi-line. The pi-lines may then be used to correct misalignment between the opposing projections due to, for example, inaccuracies in the relative motion of the sample 204, the source and the detector through optimizing the consistency of the pi-line data for each pair of opposing projections. While the inconsistency of the pi-line data may not be an accurate assessment of the amount of misalignment, the optimization of the pi-line consistency may reduce or eliminate the misalignment, which may result in improved images of the sample 204. In other embodiments, the consistency of individual pi-lines may not be used explicitly, but instead the average consistency of all pi-lines from the plurality of opposing projections may provide a smooth enough function, e.g., misalignment averaged over all pi-lines, that can be optimized for correcting the misalignment associated with all projections simultaneously. In another embodiment, each projection may be aligned (corrected) separately by maximizing the consistency of the plurality of pi-lines associated with that projection, and the alignment improved by iterating over all projections and then repeating a number of times. The misalignment may then be reduced or eliminated by either aligning the pi-lines, e.g., translating one or both of the opposing projections to align their pi-line pixels, altering the projections through zooming, i.e., changing magnification, or by representing the misalignment as a modified scanning trajectory which may also cause the pi-line pixels (pi-line pixel data) to shift commensurately. In some embodiments, an estimate of the scanning trajectory may be modified to account for the misalignment and/or inconsistency.

The scan 203 may be obtained based on either the scan trajectory 214B or 214C, both being an example of a space-filling type scan trajectory. The scan trajectories 214B and 214C are shown as an array of dots spaced around the sample 204. The dots represent locations where projections are obtained. The two scan trajectories 214B and 214C are variants of one another, and not necessarily different. For example, scan trajectory 214C may be characterized as a skewed version of 214B. Of course, other characterizations and layouts of the array are possible and contemplated herein. The scan trajectories 214B and 214C may be referred to as space-filling trajectories because they form the shown array and obtain projections across the surface area of the sample 204 instead of along a continuous line around the sample 204, such as the trajectory 214A. With regards to opposing pairs of projections, the scan trajectories 214B and 214C may result in a larger number of opposing projections due to the areal layout of the scan trajectories. As such, there is likely a larger number of opposing pairs of projections having at least one pi-line than obtained with the scan trajectory 214A, which may be due to a more even (e.g., more isotropic) distribution of pi-lines than about the sheer number of projections.

Figure 3A:
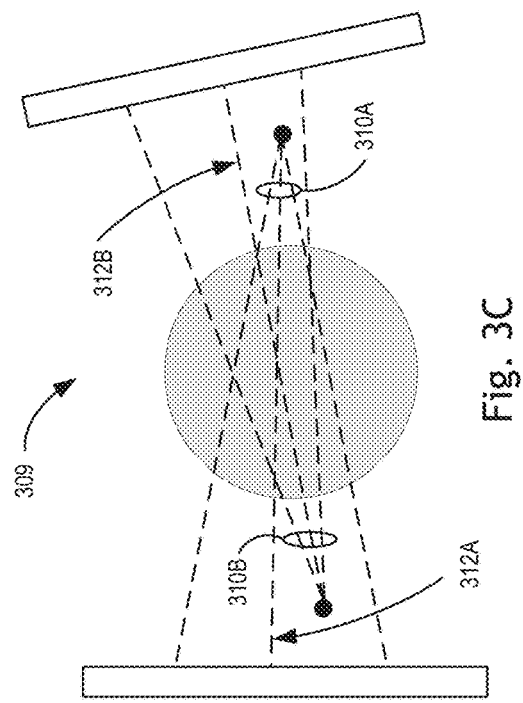
FIGS. 3A, 3B, 3C, and 3D are illustrative plan views of CT scan projections in accordance with an embodiment of the present disclosure
Figure 3B:
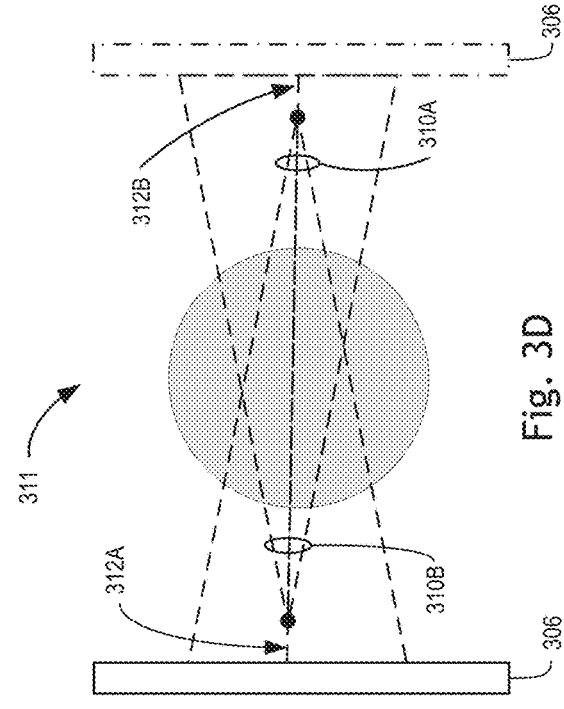

FIGS. 3A and 3B are illustrative plan views of CT scan projections 305 and 307, respectively, in accordance with an embodiment of the present disclosure. The CT scan projections 305 and 307 may be obtained by the system 100, for example, during a single CT scan. The projections 305 and 307 may be obtained using any of the scan trajectories discussed in FIG. 2, such as helical, double helical, and SF. However, any scan trajectory may be implemented to obtain projections 305 and 307. The CT scan projections 305 and 307 may both be obtained of sample 304 using x-rays 110A, 110B traversing the sample 304 from source 302 and impinging detector 306. The x-rays 110A, 110B may be parallel, cone- or fan-shaped, which may depend on the detector arrangement in some embodiments. The shape of the x-rays incident on the sample is a non-limiting aspect of the present disclosure. Individual x-rays of the CT scans 305 and 307 may propagate along individual paths, or traces, from source 302, through sample 304, and impinging on detector 306.

Figure 3C:
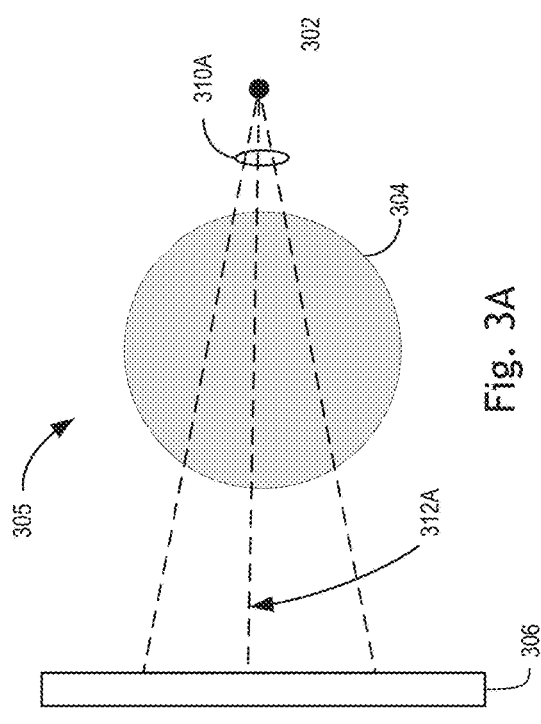

The projections 305 and 307 may be obtained from opposite sides of the sample 304, e.g., they may be opposing projections having an associated pi-line and pi-line data for each of the opposing projections, which may also be referred to as pi-line projections. Based on a model of the implemented scan trajectory, e.g., a space-filling type or linear-type trajectory, the system 100 may determine that the projections 305 and 307 are pi-line projections (opposing projections), e.g., that there is at least one ray from each projection that traverses the same path through the sample 304 and passes through the virtual space of the source 302 location of the other projection. However, due to inaccurate movement of the stage, source, or detector, the pi-line projections may be misaligned, as shown in FIG. 3C. For illustrative purposes only, the middle x-ray trace 312A from projection 305 and x-ray trace 312B from projection 307 may be the expected pi-line. As shown in FIG. 3C, the combined projections 309 are misaligned as indicated by the two x-ray traces 312A and 312B not traversing the same path through the sample 304, nor incident upon the source 302 of the other projection. The amount of offset, which may be due to rotation offset, is exaggerated for illustrative purposes.

In addition to misalignment, associated pi-line data may be inconsistent due to source fluctuations/inconsistency in intensity and/or spectral composition. While this inconsistency may not appear as a misalignment, the inconsistency may result in a difference in the pi-line pixel data, which may also be corrected for by the disclosed technique.

Figure 3D:
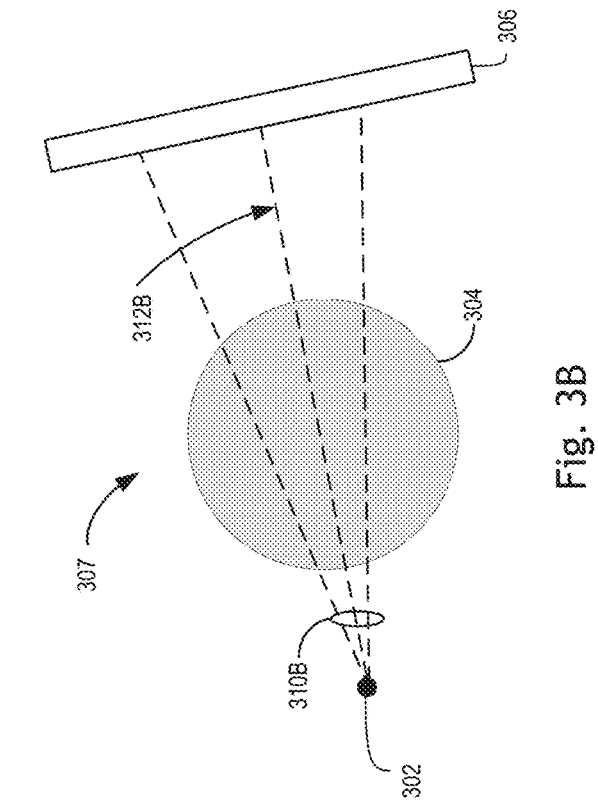

After alignment of the two projections 305 and 307, as shown by the combined projection 311 in FIG. 3D, the pi-lines 312A and 312B are aligned. The two projections may be aligned my translating, rotating or zooming either or both of the projections 305 and 307, or by modifying the modeled scan trajectory, for example by shifting the source location. The amount of alignment may be determined by the amount of misalignment and/or the amount of inconsistency between the pi-line data, which may also affect corrective measures implemented. If the misalignment is large, e.g., errors greater than five detector pixels, the alignment may be corrected by shifting the source location and the projection. Movement of both the source and detector may be referred to as "modifying the modeled scan trajectory." As shown in FIG. 3D, the right detector 306 is drawn as a dashed/dotted outline to indicate the projection was also shifted, not just the source location. If the amount of misalignment is low, e.g., less than about five pixels, the alignment may be corrected by shifting only the projection, e.g., detector shift.

Figure 4:
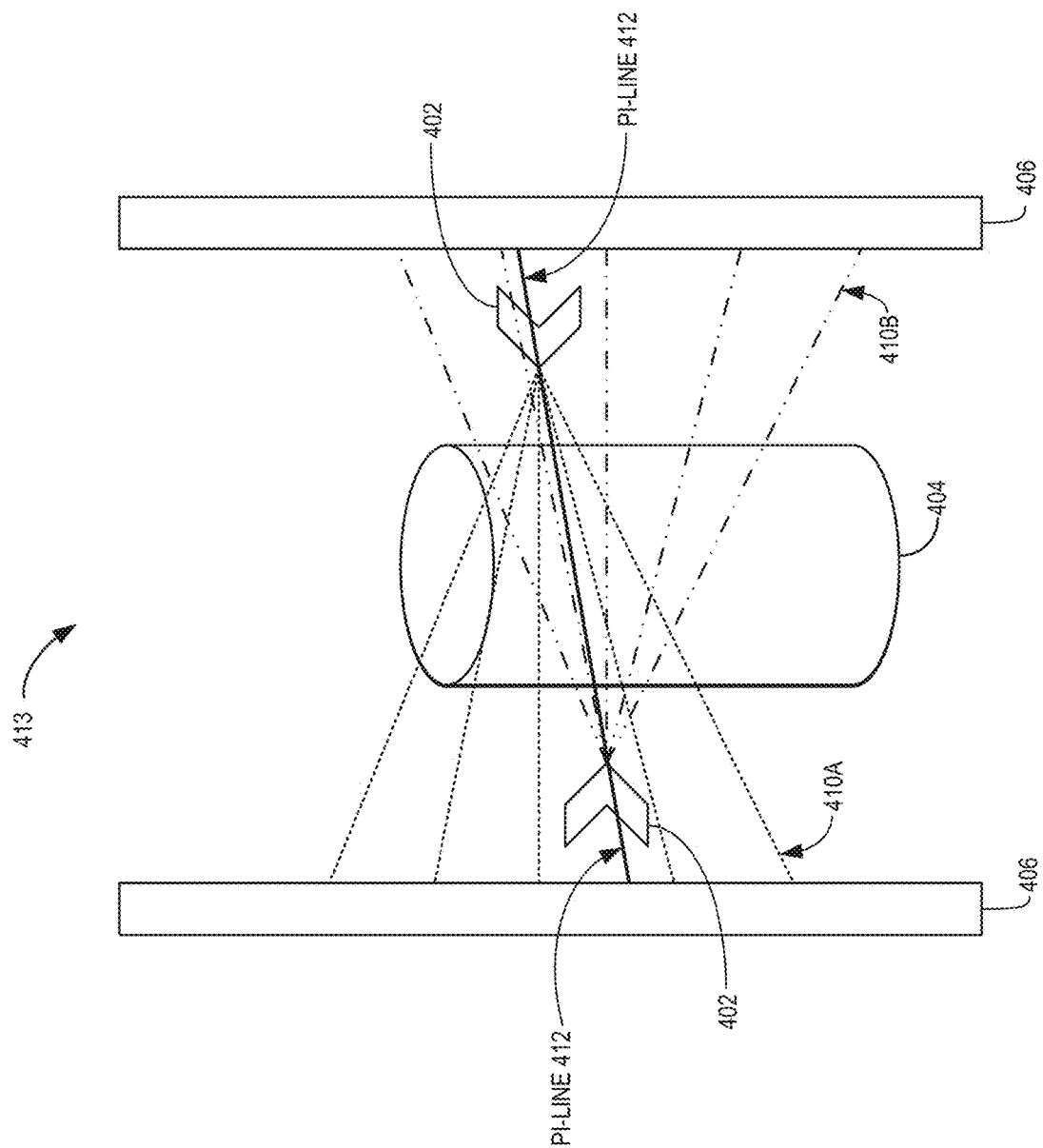
FIG. 4 is an illustrative combination of two pi-line projections in accordance with an embodiment of the present disclosure.

FIG. 4 is an illustrative combination 413 of two pi-line projections in accordance with an embodiment of the present disclosure. The combination 413 includes a pair of pi-line projections obtained during a CT scan implementing a desired scan trajectory. In some embodiments, the scan trajectory may be a helical or double helical trajectory that includes rotation and z-translation. As such, a pair of pi-line projections may be obtained from different height locations in reference to the sample 404. Of course, other scan trajectories may also be implemented. Although the heights of the two projections may be different, there still may be an associated pi-line, such as pi-line 412. However, because the two projections are obtained at different z locations, the projection data may not completely overlap, but may at least have the pi-line 412 data in common, which may also be generally true of any pair of pi-line projections where the source points are not exactly 180° apart. Of course, additional features of the sample 404 may be included in the projection data from both projections.

A first projection may include the x-rays 410A with the opposing projection including x-rays 410B. As shown in FIG. 4, the pi-line 412 traverses the same path through the sample and passes through the source location for each projection. Based on a model of the implemented trajectory, the CT system will know which pixel or neighborhood of pixels of the detector 406 is associated with the pi-line data of each projection. If the projections are aligned, the projection data of the pixels should be equal since the x-rays would have traversed the same path through the sample 404, thereby experiencing the same attenuation. If, however, the projections are misaligned, then the pixel data will be different, indicating the misalignment.

The CT system may then determine how to translate, rotate and/or zoom at least one of the projections to minimize or eliminate the difference in the pixel data, thereby aligning the two projections. Alternatively the system may allow perturbations in the modelled source trajectory.

Figure 5B:
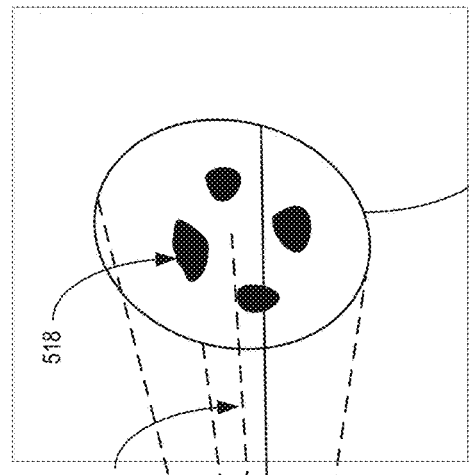
FIGS. 5A, 5B, and 5C illustrate a pair of projections in accordance with an embodiment of the present disclosure.
Figure 5C:
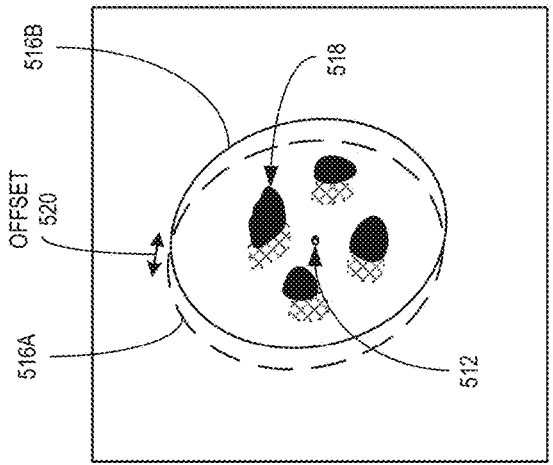
Figure 5A:
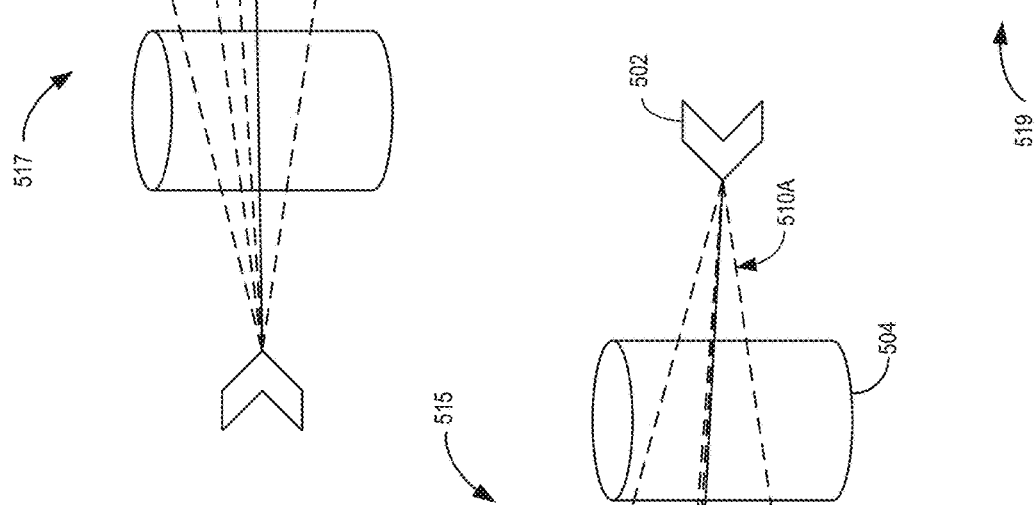
Figure 5A:
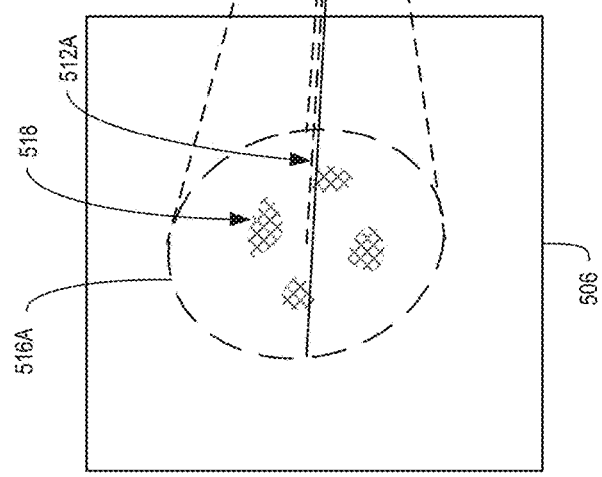

FIGS. 5A through 5C illustrate a pair of projections 515 and 517 in accordance with an embodiment of the present disclosure. The projections 515 and 517, as shown in FIGS. 5A and 5B, may be obtained from a single CT scan and, in some embodiments, may be pi-line projections. The projections 515 and 517 may be obtained using a space filling trajectory, for example. The pi-line projections 515 and 517 may be misaligned by an amount as shown in FIG. 5C. The misalignment 520 may be due to time-dependent misalignment occurring during the CT scan of projections 515 and 517, for example. Additionally, the pi-line projections 515 and 517 may suffer from source intensity and/or spectral content fluctuations, that affects respective pi-line pixel data consistency.

The projection 515 includes features 518 and pi-line 512A shown in partial image 516A of sample 504. The partial image 516A being formed due to x-rays 510A generated by source 502 and impinging on detector 506 after traversing through the sample 504. The partial image 516A may be formed from raw or nearly raw pixel data. Nearly raw pixel data may be raw pixel data corrected for bright or dark field, for example, but may also be preprocessed as discussed above. The projection 517 may result in the partial image 516B that also includes features 518 and pi-line 512B.

FIG. 5C illustrates the misalignment 520 by overlaying the projections 515 and 517. As illustrated, the misalignment 520 may include a rotational, a magnification and a translational component. The point or pixel 512 associated with the pi-lines 512A, B is determined to correspond to the pi-lines due to a model of the trajectory. The difference in the pixel values for the pi-lines 512A, B can be used to minimize this difference, which may also result in the misalignment 520 being reduced or eliminated and/or a best approximation of the misalignment 520 identified. As such, the projections 515 and 517 may be aligned and any resulting reconstruction may be improved in quality.

In some embodiments, the amount of misalignment/inconsistency may affect the implemented correction. For example, if misalignment 520 is small, e.g., around five pixels, then the projections may overlay each other to a reasonable approximation. If, however, the misalignment 520 is large, e.g., greater than around 5 pixels, then the misalignment may not be corrected by geometric transformation. In this instance, the viewing angle may have also changed relative to the ideal trajectory, and therefore the projection, either 515 or 517, may be different than the ideal projection. If the pi-line data includes inconsistencies due to source fluctuations, the corrective action may include zooming one or both projections, for example.

Figure 6:
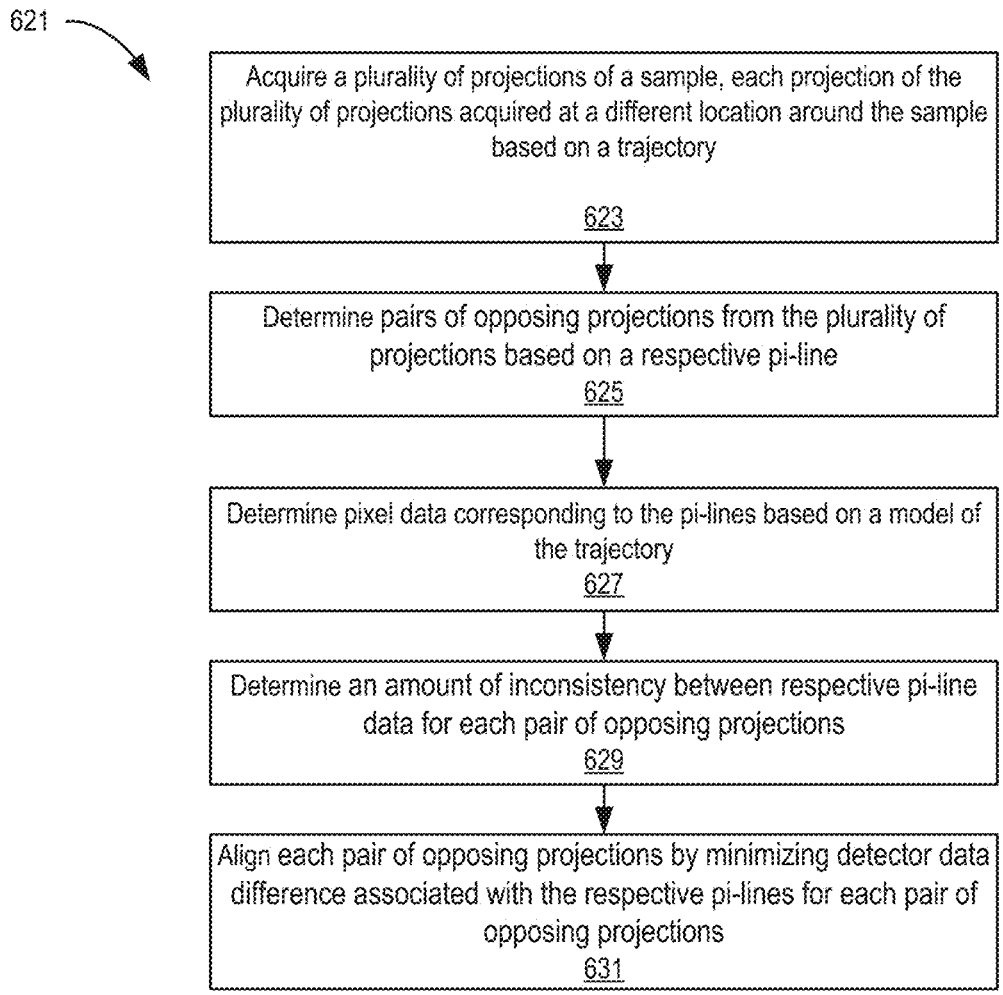
FIG. 6 is an example method for aligning projections of a CT scan based on pi-lines in accordance with an embodiment disclosed herein.

FIG. 6 is an example method 621 for aligning projections of a CT scan based on pi-lines in accordance with an embodiment disclosed herein. The method 621 may be performed by a CT system, such as the CT system 100. The method 621 may begin at process block 623, which includes acquiring a plurality of projections of a sample, each projection of the plurality of projections acquired at a different location around the sample based on a trajectory. The trajectory may be circular, helical, double helical, or space filling, for example. The projections may result in attenuation data for each x-ray traversing the sample and impinging on a detector. Pixels of the detector may be associated with an x-ray, some of which traverse the sample resulting in the attenuation data, e.g., image data.

Process block 623 may be followed by process block 625, which includes determining pairs of opposing projections from the plurality of projections based on a respective pi-line. Process block 625, in some embodiments, may include determining a subset of all sets of opposing projections based on associated pi-lines, and not all opposing projections may be determined. In general, each scan may result in a large number of opposing projections, e.g., a plurality of pi-line projections.

Process block 625 may be followed by process block 627, which includes determining pixel data corresponding to the pi-lines based on a model of the trajectory. The system, based on the model of the trajectory, may determine which pixel corresponds to the pi-line of the opposing pair of projections. Additionally, the method 621 may determine which pixel corresponds to the pi-line of each of the plurality of pi-line projections. It should be noted that the disclosure is not limited to determining one or all pixel data, and in some embodiments, a subset of the pi-line projections and the associated pixel data may be determined. While the discussion states that the data may be related to a pixel, it is also possible that the pixel data may need to be interpolated from neighboring pixels in the instance where the pi-line ray impinges the detector between pixels and not directly on a pixel. The process block 627 may be a subset of the process block 625.

Process block 627 may be followed by process block 629, which includes determining an amount of inconsistency between respective pi-line data for each pair of opposing projections, where the inconsistency indicates that the opposing projections, e.g., the pi-line projections, are either misaligned or that source inconsistency occurred. In some embodiments, the inconsistency may be determined based on attenuation data associated with the pi-line data for each projection in each opposing pair of projections. For example, the pixel data associated with the pi-line for each projection of the pair of projections may be compared to determine if they are different, and if so, how much different. Based on the presence of a difference, the system may determine that there is misalignment in the projections, which may include an amount of rotational, magnification and translational misalignment. While the amount of misalignment may not be determined from the pi-line inconsistency, e.g., difference in pi-line pixel data, the reduction or elimination of the inconsistency may result in reducing or eliminating the misalignment. Further, the method 621 may repeat block 627 for each pi-line projection of the plurality of pi-line projections to determine an associated misalignment for each of the plurality of pi-line projections.

Process block 629 may be followed by process block 631, which includes aligning each pair of opposing projections by minimizing detector data difference associated with the respective pi-lines for each pair of opposing projections. In some embodiments, all identified pi-line projections, e.g., the plurality of pi-line projections, showing misalignment and/or inconsistency may be simultaneously or iteratively aligned to minimize the total detector data difference from the many (most likely greater than 100,000) pi-lines of the scan.

Figure 7:
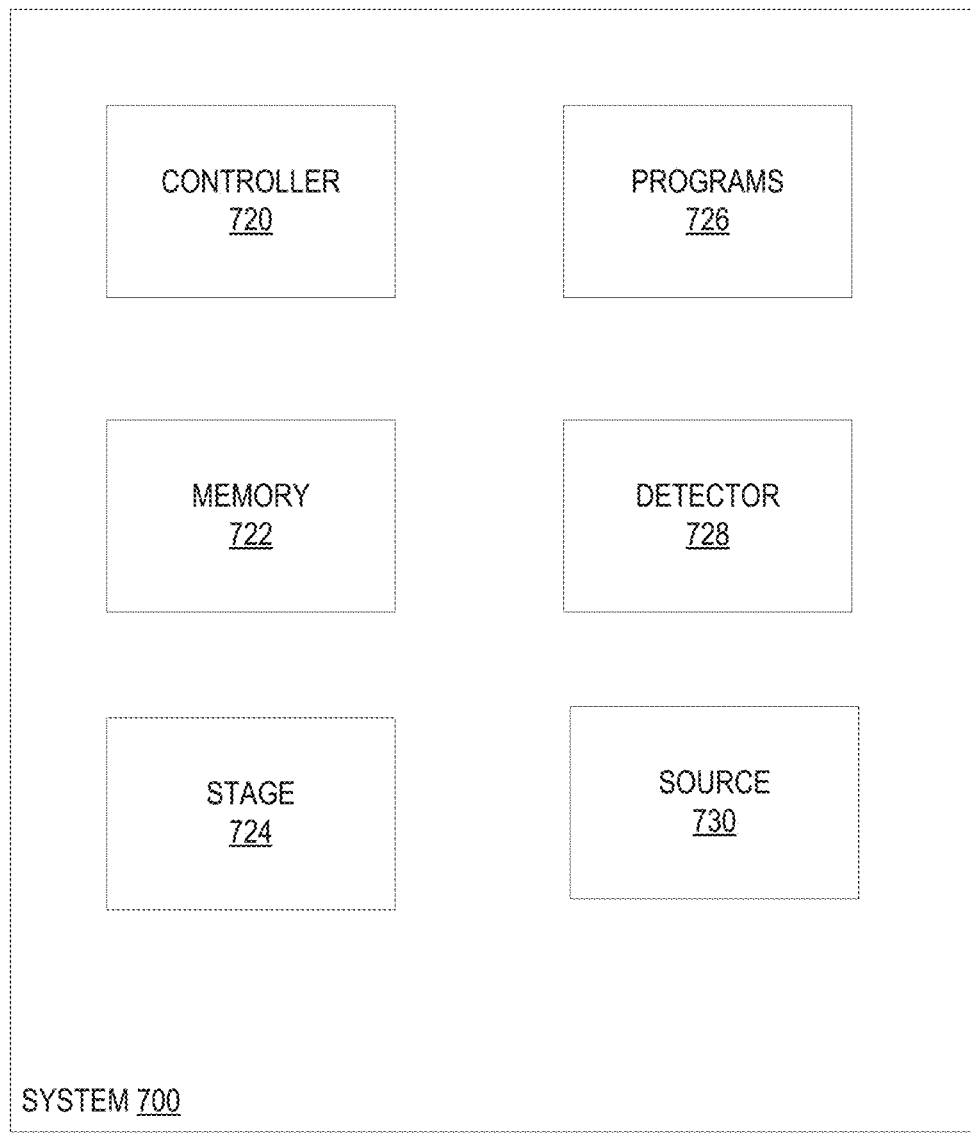
FIG. 7 is an example functional block diagram of a CT system in accordance with an embodiment of the present disclosure.

FIG. 7 is an example functional block diagram of a CT system 700 in accordance with an embodiment of the present disclosure. The CT system 700 may be an example of the CT system 100, and may be used to obtain CT scans of samples and provide reconstructions of various slices and volumes of the sample. The CT system 700 may at least include a controller 720, memory 522, stage 724, programs 726, detector 728, and source 730. In general, the CT system 700 may perform scans of samples as described herein.

The controller 720 may be a micro controller, a CPU, one or more computing cores, or the like. The controller 720 may control multiple aspects of the CT system 700 and may be coupled to receive data from and provide control signals to the various other components of the CT system 700. For example, the controller 720 may execute code stored in programs 726 to cause the CT system 700 to perform CT scans using a desired trajectory and determine pi-line projections based on a model of the trajectory. Further, based on associated pixel data for the pi-lines, the system 700 may determine an amount of inconsistency, if any, between the pi-line projections and minimize any difference to correct for inconsistency. Additionally, scan data obtained by the detector 728 may be provided to the controller 720. In response, the controller 720 may perform algorithms on the data to provide CT scans, projections, etc. The algorithms, as noted, may be part of the programs 726.

The memory 722 may be volatile or non-volatile memory coupled to hold data and instructions. The programs 726, which may be a portion of the memory 722, may include operating instructions and code for performing the various tasks of the CT system 700, such as controlling a stage, a source, and a detector, along with various other ancillary components.

The stage 724 may support the sample and provide movement thereof in response to control signals provided by the controller 720. The control signals may be generated by the controller 720 while executing stage control instructions stored in memory 722 and/or programs 726. For example, the stage control may cause the stage to move in accordance to a desired trajectory, such as a helix, double helix, or a space filling pattern, for example.

The detector 728 may detect x-rays having passed through the sample and record their intensity. The intensity of the x-rays may be reduced due to attenuation from passing through the sample. The amount of attenuation may be the data used to image the sample and for generating reconstructions. The image data, or scan data, may be provided to the controller 720 for processing, or stored in memory 722 for later processing. Additionally, the detector 728 may be moved in response to control signals from the controller 720.

The source 730 provides the x-rays to the sample and may be controlled by the controller 720. For example, the source 730, in response to control signals from the controller 720, may generate x-rays at a desired intensity and may also move in a direction with respect to the sample.

What is claimed is:

1. A method comprising:
   acquiring a plurality of projections of a sample, each projection of the plurality of projections acquired at a different location around the sample based on a trajectory;
   determining pairs of opposing projections from the plurality of projections based on a respective pi-line;
   determining an amount of inconsistency between respective pi-line data for each pair of opposing projections, wherein the pi-line data is based, at least in part, on detector data; and
   aligning each pair of opposing projections by minimizing detector data difference associated with the respective pi-lines for each pair of opposing projections, wherein for each pair of opposing projections, shifting the detector location and/or orientation, and/or the source location until the detector data difference between the pair of opposing projections is minimized.

2. The method of claim 1, wherein determining an amount of inconsistency between the respective pi-line data for each pair of opposing projections includes determining a difference between pi-line detector data associated with each projection of each pair of opposing projections.

3. The method of claim 2, wherein the pi-line detector data associated with both projections of each pair of opposing projections is based on data from a pixel of a detector or data interpolated from two or more neighboring pixels of the detector.

4. The method of claim 1, wherein the pi-line is a ray path associated with both projections of each of the pairs of opposing projections that traverses the same path through the sample and the source location of both projections of each pair of opposing projections.

5. The method of claim 1, wherein the detector data is raw intensity data.

6. The method of claim 1, wherein the detector data is raw intensity data having undergone one or more preprocessing steps.

7. The method of claim 6, wherein the one or more preprocessing steps includes correction for bright field.

8. The method of claim 6, wherein the one or more preprocessing steps includes correction for dark field.

9. The method of claim 1, wherein the inconsistency is due to misalignment between the opposing pairs of projections, source intensity variations, or a combination thereof.

10. The method of claim 1, wherein the trajectory is selected from one of a helical, a double helical, and a space filling trajectory.

11. The method of claim 1, wherein minimizing the detector data difference associated with the pi-line includes responsive to the amount of inconsistency greater than a threshold, the detector data difference associated with the pi-line is minimized by shifting the source location and the projection; and responsive to the amount of inconsistency lower than the threshold, the detector data difference associated with the pi-line is minimized by shifting only the projection.

12. The method of claim 1, wherein minimizing the detector data difference associated with the pi-line further includes, translating, rotating or zooming either or both of the opposing projections.

13. The method of claim 11, wherein aligning each pair of opposing projections includes iteratively minimizing the inconsistency between the respective pi-line data of each pair of opposing projections.

14. The method of claim 11, wherein aligning each pair of opposing projections includes collectively minimizing pi-line inconsistency for each pair of opposing projections.

15. A computed tomography system comprising:
    a source to provide x-rays;
    a detector to detect x-rays after having passed through or around a sample; and
    a controller coupled to control the source and the detector, the controller further including code, that when executed by the controller, cause the controller to:
      acquire a plurality of projections of a sample, each projection of the plurality of projections acquired at a different location around the sample based on a trajectory;
      determine pairs of opposing projections from the plurality of projections based on a respective pi-line;
      determine an amount of inconsistency between respective pi-line data for each pair of opposing projections, wherein the pi-line data is based, at least in part, on detector data; and
      align each pair of opposing projections by minimizing detector data difference associated with the respective pi-lines for each pair of opposing projections, wherein for each pair of opposing projections, shifting the detector location and/or orientation, and/or the source location until the detector data difference between the pair of opposing projections is minimized.

16. The computed tomography system of claim 15, wherein the code that causes the controller to determine an amount of inconsistency between the respective pi-line data for each pair of opposing projections further includes code, that when executed, causes the controller to determine a difference between pi-line detector data associated with each projection of each pair of opposing projections.

17. The computed tomography system of claim 15, wherein the pi-line detector data associated with both projections of each pair of opposing projections is based on data from a pixel of the detector or data interpolated from two or more neighboring pixels of the detector.

18. The computed tomography system of claim 15, wherein the pi-line is a ray path associated with both projections of each of the pairs of opposing projections that traverses the same path through the sample and the source location of both projections of each pair of opposing projections.

19. The computed tomography system of claim 15, wherein the detector data is raw intensity data.

20. The computed tomography system of claim 15, wherein the detector data is raw intensity data having undergone one or more preprocessing steps.

21. The computed tomography system of claim 20, wherein the one or more preprocessing steps includes correction for bright field.

22. The computed tomography system of claim 15, wherein the inconsistency is due to misalignment between the opposing pairs of projections, source intensity variations, or a combination thereof.

23. The computed tomography system of claim 15, wherein the trajectory is selected from one of a helical, a double helical, and a space filling trajectory.

24. The computed tomography system of claim 15, wherein minimizing the detector data difference associated with the pi-line includes responsive to the amount of inconsistency greater than a threshold, the detector data difference associated with the pi-line is minimized by modifying the trajectory; and responsive to the amount of inconsistency lower than the threshold, the detector data difference associated with the pi-line is minimized by shifting only the projection.

25. The computed tomography system of claim 15, wherein the code that causes the controller to minimize the detector data difference associated with the pi-line further includes code, that when executed, causes the controller to, translate, rotate or zoom either or both of the opposing projections.

26. The computed tomography system of claim 24, wherein the code that causes the controller to align each pair of opposing projections further includes code, that when executed, causes the controller to iteratively minimize the inconsistency between the respective pi-line data of each pair of opposing projections.

27. The computed tomography system of claim 24, wherein the code that causes the controller to align each pair of opposing projections further includes code, that when executed, causes the controller to collectively minimize the pi-line inconsistency for each pair of opposing projections.

* * * * *